US006751874B2

(12) United States Patent
Eldar

(10) Patent No.: US 6,751,874 B2
(45) Date of Patent: Jun. 22, 2004

(54) HAND TOOL FOR PUNCHING HOLES IN A RANGE OF PLASTIC IRRIGARTION PIPES

(76) Inventor: Mordechai Eldar, Odem Street 12, Or Yehuda (IL)

( * ) Notice: Subject to any disclaimer, the term of this patent is extended or adjusted under 35 U.S.C. 154(b) by 0 days.

(21) Appl. No.: 10/343,106

(22) PCT Filed: Jun. 20, 2001

(86) PCT No.: PCT/IL01/00562

§ 371 (c)(1), (2), (4) Date: Jan. 23, 2003

(87) PCT Pub. No.: WO02/00380

PCT Pub. Date: Jan. 3, 2002

(65) Prior Publication Data

US 2003/0204957 A1 Nov. 6, 2003

(30) Foreign Application Priority Data

Jun. 27, 2000 (IL) ............................................... 137046

(51) Int. Cl.$^{7}$ ............................ B23B 45/06; B26F 1/38

(52) U.S. Cl. .......................... 30/363; 408/87; 408/124; 408/129; 408/137; 408/204

(58) Field of Search ......................... 30/92, 113.2, 119, 30/358, 363, 366; 408/87, 124, 129, 137, 204

(56) References Cited

U.S. PATENT DOCUMENTS

| | | | | | |
|---|---|---|---|---|---|
| 1,305,898 | A | * | 6/1919 | Hahnemann | 30/363 |
| 1,324,621 | A | * | 12/1919 | Rosenberg | 30/363 |
| 2,421,901 | A | | 6/1947 | Murad et al. | 74/57 |
| 3,073,199 | A | | 1/1963 | Yerkes | 30/358 |
| 3,335,494 | A | | 8/1967 | Klenk | 30/363 |
| 3,395,724 | A | * | 8/1968 | Hamel | 137/318 |
| 4,574,477 | A | | 3/1986 | Lemkin et al. | 30/92 |
| 5,377,415 | A | * | 1/1995 | Gibson | 30/363 |
| 6,647,630 | B1 | * | 11/2003 | Lucas et al. | 30/363 |

* cited by examiner

*Primary Examiner*—Hwei-Siu Payer
(74) *Attorney, Agent, or Firm*—Ostrolenk, Faber, Gerb & Soffen, LLP

(57) ABSTRACT

A cutting tool for forming holes in plastic piping primarily intended for use in holing irrigation pipes for drips and sprinklers ranging from holes with diameter of 2–4 mm. The tool comprises of a blade element made of steel, preferably hardened and provided with a sharpened around cutting edge, and a body and handle made of high strength plastic material, with a lower jaw allowing the holing of pipes ranging from 12–32 mm in diameter.

4 Claims, 4 Drawing Sheets

HAND TOOL FOR PUNCHING HOLES IN A RANGE OF PLASTIC IRRIGARTION PIPES

BACKGROUND OF THE INVENTION

1) Field of the Invention

The invention generally relates to producing holes, and more specifically relates to a hand tool for punching holes preferably in plastic irrigation pipes of which there are two types. The one leaves the factory already equipped with drips installed at regular intervals and the second is a so-called plain pipe that has to have the holes punched in it when the pipe is laid out in the field or garden and have the drips installed afterwards. The invention relates substantially to the second type of pipes, although it can be used in connection with the first type as well, when there may be necessity to add holes. The invention also can be used for producing holes in any flexible plastic piping. Additionally, subsequent to technological developments new irrigation drip-pipes have been introduced that have internal integral drips. In this case there sometimes arises the need to add holes or open clogged holes, and with this in mind the invention can cut a precise hole, the depth of which is controlled and therefore prevents cutting through the internal element of the drip-pipe.

2) Description of the Prior Art

The simple hand tool for punching holes in agricultural plastic irrigation pipes with a short handle onto which is affixed a cutting element have been known for years. A more advanced punch tool as found in my invention registered as Israel patent no: 105443, overcame the many disadvantages associated with the simple tools and provided a reliable tool, although was limited to two pipe sizes only. This present invention introduces a tool that has three advantages over the former invention.

a) The cutting element penetrates the pipe in a spiral action facilitating the cutting operation.
b) The tool is suitable for cutting holes in pipes having a diameter between 12 mm and 32 mm.
c) The depth of penetration of the cutting element can be adjusted according to need thereby adapting the tool to suit also the drip-pipes with the integral drips.

These three points show that the present invention is a more efficient development and advancement on the previous invention.

SUMMARY OF THE INVENTION

Against the described background it is therefore a main object of the invention to provide an improved hand operated tool incorporating in it the elements necessary to suit itself to use with a wide range of plastic irrigation pipes. The other object of the invention is to provide an improved tool, enabling easy and convenient cutting of holes. An additional object of the invention is to provide a new and improved tool, which is capable of cutting holes in the so-called integral drip-pipes without damaging the integral elements, residing within the said integral pipes.

The accompanying drawings, which are incorporated in and form a part of the specification, illustrate preferred embodiments of the present invention and together with the description, serve to explain the principles of the invention.

DETAILED DESCRIPTION OF THE PARTS OF THE TOOL

Figure 1:
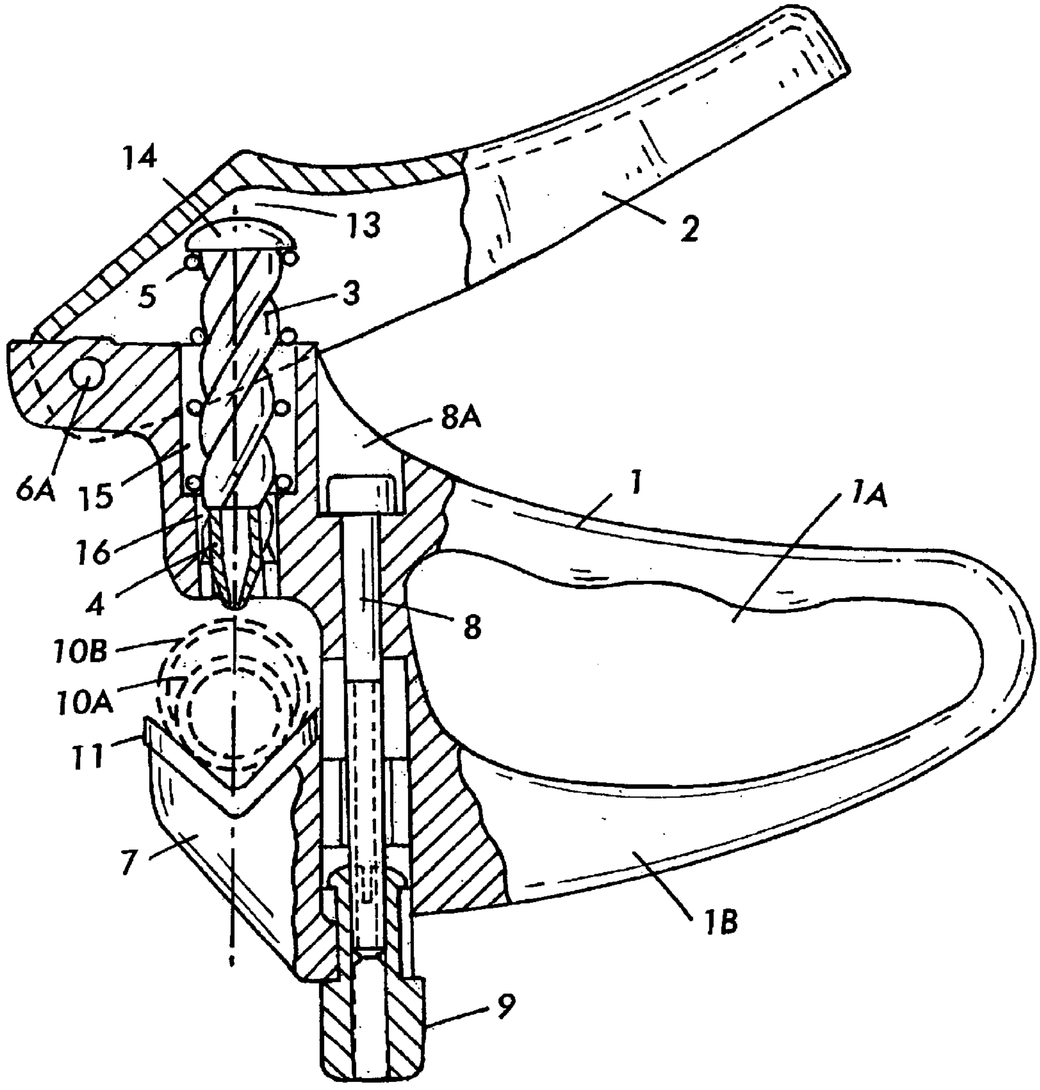
FIG. 1: A general cross-section view of the whole tool.
Figure 2:
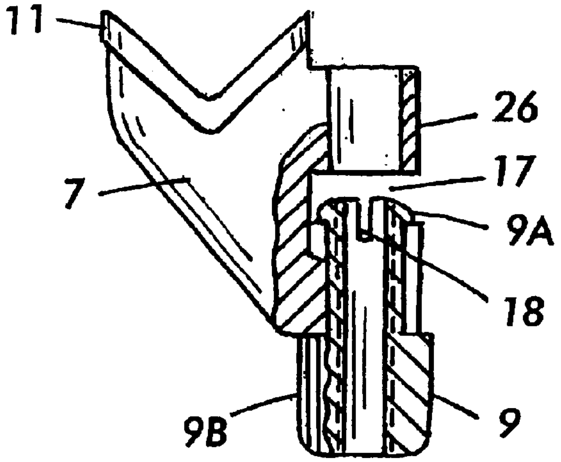
FIG. 2: The lower jaw with V-shaped support for holding the irrigation pipe.

With reference to FIG. 1 the main body portion of the tool (1) made of high strength molded plastic material onto which all the other parts of the tool are assembled. The tool consists of a handle (2), the cutting blade (3), the lower jaw support (7) for the pipe and the screw (8). The screw (8) is made of steel and is 6–8 mm in length. The screw (8) is inserted by pressure through the opening (8A) into the body portion (1) and remains fixed without movement. The body portion (1) of the tool is built with an opening (1A) such that the fingers of the hand can comfortably hold it and easily pull the handle (1B) that supports the lower jaw (7) of the tool during the holing operation. The lower jaw (7) that holds the pipe (10), is formed with prismic-shaped lips (11) and is also made of the same high strength molded plastic material as the body portion. It is shown in FIG. 2, that these prismic V-shaped lips (11) allow the holding of the said different sized pipes (10A, 10B) in such a way that the squashing of the pipe is avoided (this squashing would make the penetration of the cutting element extremely difficult). This lower jaw (7) part has an adjusting screw-nut (9) also made of the same high strength molded plastic material, in the center of which is an internally threaded hole through which the screw (8) passes. The adjusting screw-nut (9) has a groove (18) in its tip (9A) that ensures that the screw-nut (9) sits permanently in the recess (17) made for it in the lower jaw (7) and thus achieving the circular movement. The head of the adjustment screw-nut (9) is shaped with ribs (9B) facilitating the turning of the screw-nut (9).

Figure 3:
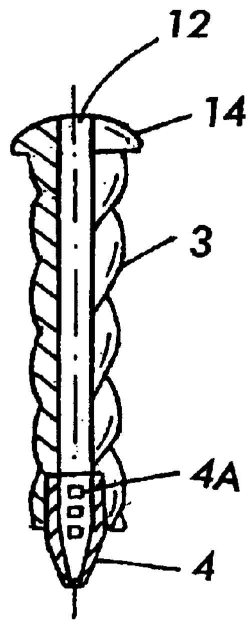
FIG. 3: The spiral cutting element.
Figure 9:
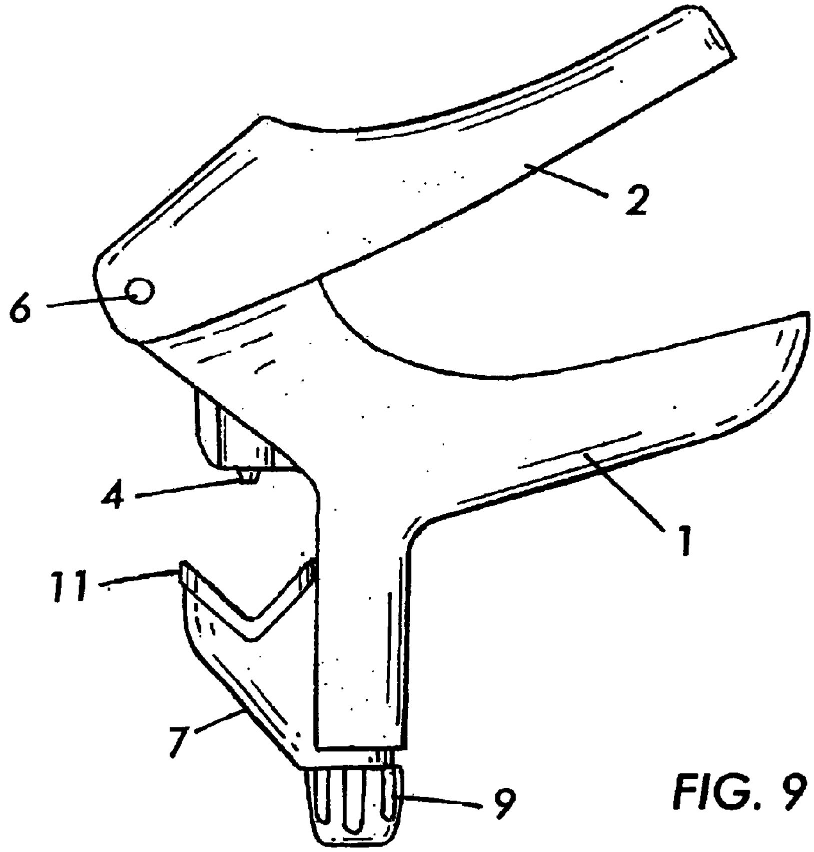
FIG. 9: A general view of an alternative embodiment of the tool of the invention.
Figure 6:
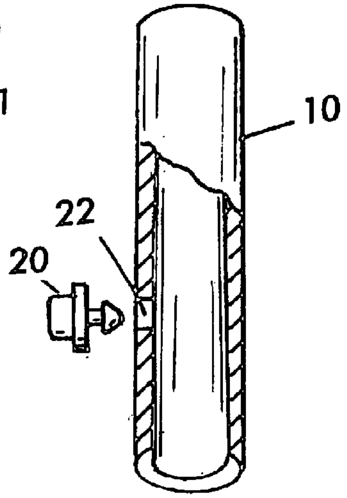
FIG. 6: A partial cross-sectional view of a standard polythelene pipe.
Figure 7:
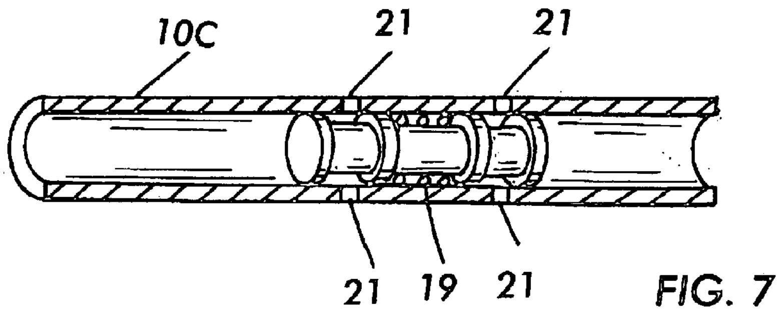
FIG. 7: A cross-section view of an integral drip-pipe.
Figure 8:
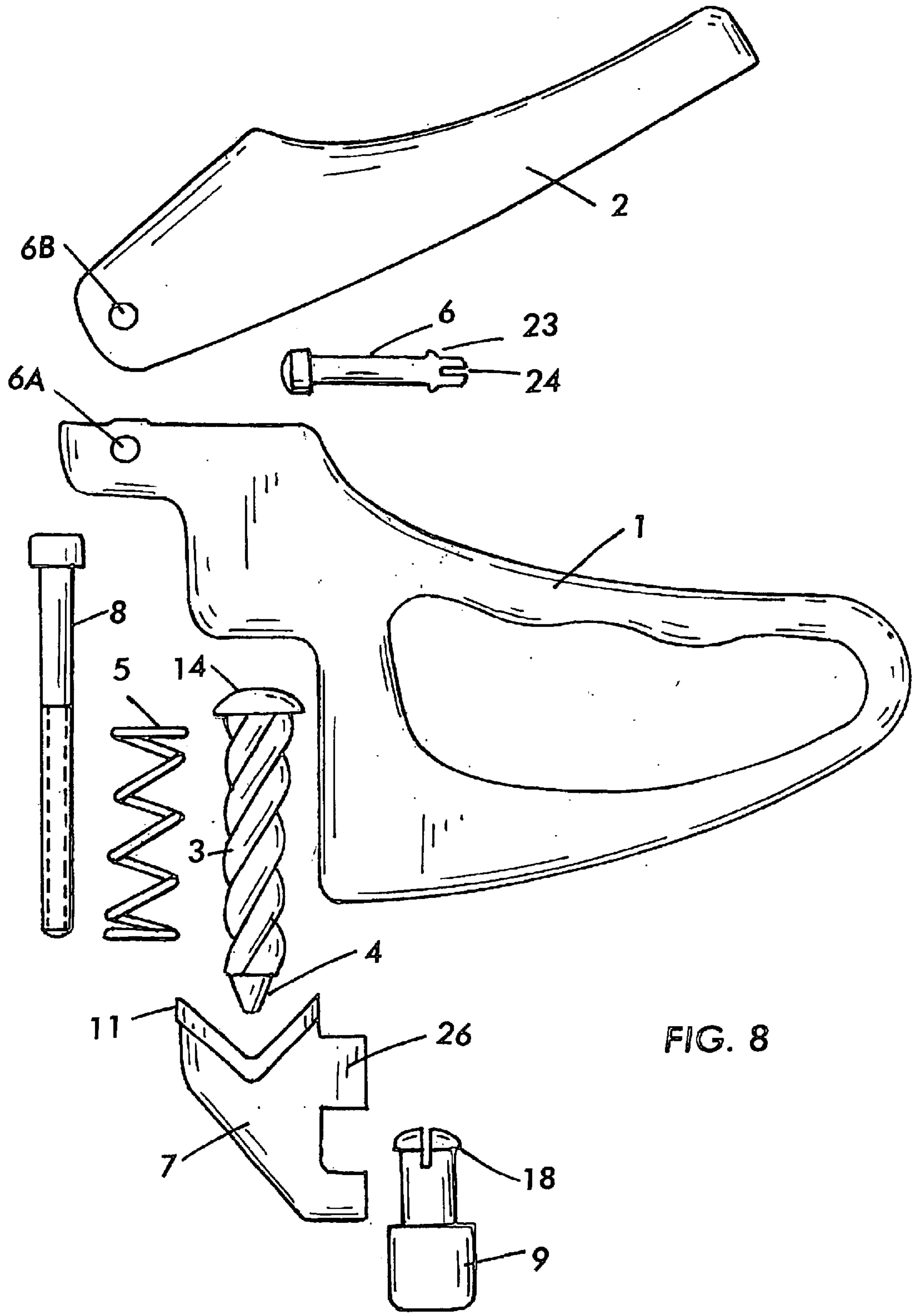
FIG. 8: A general view of the disassembled parts.

The cutting element, as seen in FIG. 3 consists of the blade holder portion (3) and the blade (4) inserted within the holder portion. The cutting blade sits tightly within the holder by virtue of inner lateral protrusions made in the holder (not shown). The blade holder (3) made of the same said high strength molded plastic material, is spirally shaped with four beginning threads, and carries at its lower part, a steel cutting blade (4). The center part of the blade (4) and blade holder (3) is hollow allowing the waste plastic that is cut out of the pipes to pass up and out of the upper exit (12). From there the waste plastic falls out of the space (13) between the handle and the blade holder. The handle (2) is pivotably mounted on the upper extremity of the body portion (1) by virtue of a pin (6), inserted within the openings (6A, 6B), made respectively in the body portion and the handle. The tip (23) of the pin (6), by virtue of its groove (24) ensures that the pin will not fall out once inserted in position. The handle (2) is made with a recess in which the head of the blade holder (3) enters and thus the handle (2) can exert force on the head once the handle is pressed by the hand. The cylindrical head (14) of the spirally shaped blade holder (3) holds the spring (5) in place. The spring (5) returns the blade holder (3) to its resting position at the completion of the operation of the handle. The diameter of the spring (5) is only fractionally larger that the blade holder (3) thus ensuring the blade holder (3) will not bend out of shape after the operation of the handle (2). The cutting blade (4), pressure-inserted into the blade holder (3) is permanent, and is made of hardened tempered and sharpened steel. The cutting blade is provided with an exit opening (12) larger that the entrance (4A) which allows the cut waste plastic to be released immediately after the holing of the pipe. In the view of the tool shown in FIG. 4, one can see the screw (8) and the recess (25) through which the screw (8) enters the hollow center of square side part (26) in the lower jaw (7). In the upper part of the tool, as can be seen also in FIG. 4, there is the entrance (15) of the spirally shaped recess (16) through which the cutting blade (4) and its holder (3) pass through in the spiral screwing action. The standard plastic irrigation pipe as shown in FIG. 6 is made of polythelene and the hole (22) of size 2–4 mm provides the place for inserting the dripper (20) into it. The integral drip-pipe (10C) is shown in FIG. 7 in which the drip (19) is integrally inside the pipe. The importance here is that during the cutting of the holes (21) the tool must reach only to the integral part and no further so as not to damage the integral part of the drip-pipe. In FIG. 9 is seen still a further embodiment of the tool of the invention. In this embodiment the body (1) portion is not provided with the opening, but is formed with a solid handle portion.

HOW TO OPERATE THE TOOL

Figure 4:
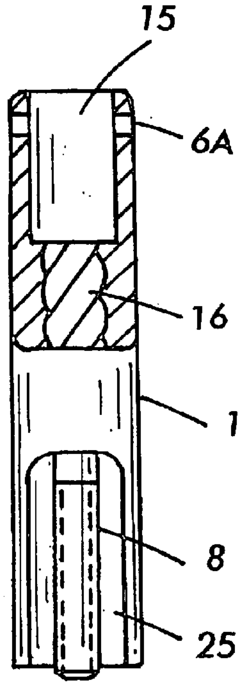
FIG. 4: A partial left side view of FIG. 1.
Figure 5:
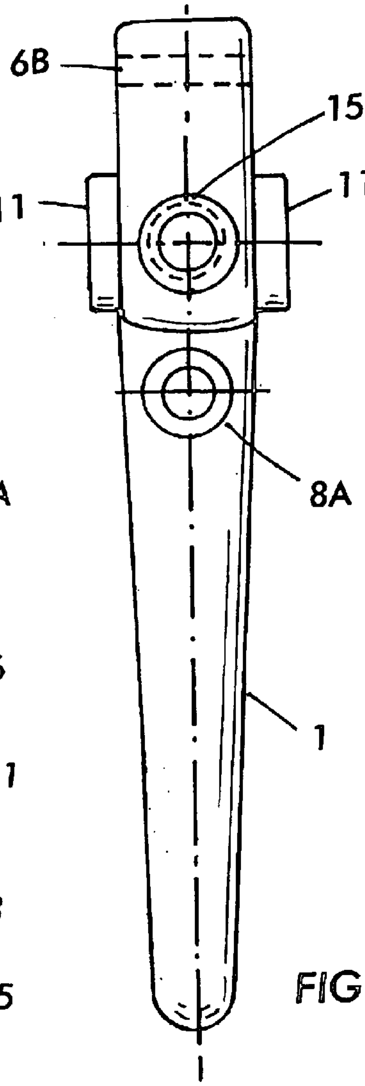
FIG. 5: A view of the tool at the top end thereof.

When the handle (2) is pressed in the direction of the body (1) of the tool a lever action is created in which the handle (2) presses on the cutting element (3) causing the cutting element to move down in the direction of the center of the pipe (10) in a spiral action matching the screwed position in the body (16) as in FIG. 4. The pipe (10) held in the lower jaw (7) is supported by the prismic-shaped lips (11). The depth of the penetration of the cutting element into the pipe is controlled by the adjusting screw-nut (9) that is screwed onto the screw (8). The spirally turning action facilitates the cutting of the hole in the pipe (10), the cut waste plastic enters the blade and is discharged up and through the cutting element exiting through the enlarged hole at the back end of the blade holder (3) and out through the exit (13).

What is claimed is:

1. A cutting tool for forming a hole in a plastic pipe by a hollow cutting element, capable of penetrating through the wall of the pipe upon applying a force thereon, the said tool comprises a) a body portion defined by a rear grasp portion and by a frontal portion, said frontal portion is provided at its upper extremity with a through-going opening, enabling reciprocating linear displacement of the cutting element from its uppermost to the lowermost position, said frontal portion is formed with a through-going bore for a mounting screw, b) a pressure handle, pivotably connected to the upper extremity of the frontal portion, said pressure handle is adapted to exert force on the cutting element, c) a spring means, situated within the through-going opening made in the frontal portion, said spring means is capable of returning the cutting element from its lowermost position to the uppermost position, said spring means is biased upon exertion force on the cutting element, d) a support member adapted to support the pipe during cutting, said support member is mountable at the lower extremity of the frontal portion for sliding there-along, e) an adjustment means for controlling the position of the support member with respect to the lower extremity of the frontal portion.

2. The cutting tool as defined in claim 1, in which said cutting element comprises a holder and a cutting blade, said cutting blade sits tightly within the holder, said holder is formed with a head contacting the pressure handle, said head is formed with shoulders contacting the spring means.

3. The cutting tool as defined in claim 2, in which said holder is formed with a male spiral projection and at least a portion of said through-going opening is formed with a female spiral recess as to ensure, that the cutting element rotates during its displacement from the uppermost position to the lowermost position.

4. The cutting tool as defined in claim 3, in which said support member is provided with a V-shaped abutment portion.

* * * * *